US012769031B2

(12) United States Patent
Kito et al.

(10) Patent No.: US 12,769,031 B2
(45) Date of Patent: Oct. 20, 2026

(54) AMOUNT OF SNOWFALL ESTIMATION SYSTEM AND AMOUNT OF SNOWFALL ESTIMATION METHOD

(71) Applicant: NTT, Inc., Tokyo (JP)

(72) Inventors: Chihiro Kito, Musashino (JP); Yusuke Koshikiya, Musashino (JP); Daisuke Iida, Musashino (JP)

(73) Assignee: NTT, Inc., Tokyo (JP)

( * ) Notice: Subject to any disclaimer, the term of this patent is extended or adjusted under 35 U.S.C. 154(b) by 268 days.

(21) Appl. No.: 18/709,686

(22) PCT Filed: Dec. 2, 2021

(86) PCT No.: PCT/JP2021/044253

§ 371 (c)(1),
(2) Date: May 13, 2024

(87) PCT Pub. No.: WO2023/100312

PCT Pub. Date: Jun. 8, 2023

(65) Prior Publication Data

US 2025/0028078 A1 Jan. 23, 2025

(51) Int. Cl.
*G01W 1/14* (2006.01)
*G01N 23/203* (2006.01)

(52) U.S. Cl.
CPC ............ *G01W 1/14* (2013.01); *G01N 23/203* (2013.01)

(58) Field of Classification Search
CPC .......... G01H 9/004; G01W 1/14; G01W 1/02; G01W 1/06; G01W 1/16; G01W 2203/00; B60W 2555/20; B60W 40/02; B60W 40/06; G01C 21/3694; G01D 5/35306; G01D 5/35358; G01D 5/35361; G01S 15/08;

(Continued)

(56) References Cited

U.S. PATENT DOCUMENTS 9,461,706 B1 * 10/2016 Bennett .................... H04B 3/50
2011/0069302 A1 * 3/2011 Hill .................... G01D 5/35361 356/73.1

(Continued)

FOREIGN PATENT DOCUMENTS

JP 202052030 A 4/2020

*Primary Examiner* — Kristina M Deherrera
*Assistant Examiner* — Gedeon M Kidanu
(74) *Attorney, Agent, or Firm* — Harness, Dickey & Pierce, PLC

(57) ABSTRACT

Objects of the present invention are to provide a snow accumulation estimating system and a method for estimating a snow accumulation which enable a snow accumulation to be remotely measured accurately and economically.

A snow accumulation estimating system 301 according to the present invention includes: an optical fiber 50 that receives vibration from a random point on snow; a vibration measuring instrument 11 that measures the vibration received by the optical fiber 50 as a distribution in a longitudinal direction of the optical fiber 50; and an analysis processing unit 12 that has, as accumulated data, a relationship between a snow accumulation and the vibration received by the optical fiber 50, compares the distribution measured as measurement data by the vibration measuring instrument 11 with the accumulated data, and estimates a snow accumulation at the random point.

8 Claims, 2 Drawing Sheets

(58) Field of Classification Search
CPC .. G01S 15/88; G01S 15/8965; G01S 15/8977; G01S 7/52093; G01V 1/001; G01V 1/003; G01V 1/01; G01V 1/186; G01N 23/203; G01F 23/296; G01F 23/2962
USPC ........................................................... 73/643
See application file for complete search history.

(56) References Cited

U.S. PATENT DOCUMENTS

2021/0255005 A1* 8/2021 Okamoto ........... G01D 5/35358
2023/0130862 A1* 4/2023 Ozharar ................ G01F 23/296
73/643

* cited by examiner

AMOUNT OF SNOWFALL ESTIMATION SYSTEM AND AMOUNT OF SNOWFALL ESTIMATION METHOD

CROSS-REFERENCE TO RELATED APPLICATIONS

This application is a 371 U.S. National Phase of International Application No. PCT/JP2021/044253, filed on Dec. 2, 2021. The entire disclosure of the above application is incorporated herein by reference.

TECHNICAL FIELD

The present disclosure relates to a snow accumulation estimating system that measures a snow accumulation remotely and a method for estimating a snow accumulation.

BACKGROUND ART

In a snow removal operation in a heavy snow accumulation area, staff of a local government perform patrols by vehicle travel in the daytime and determine a snow removal target road on which a snow removal operation will be performed in the middle of the night. The patrols are dangerous work because the patrols are performed by traveling a long distance (about 70 to 80 km) every day on a frozen road surface in winter, and it is demanded that a snow accumulation condition is grasped in a sustainable, energy-saving, safe, and efficient manner in an area where a labor shortage is serious.

CITATION LIST

Patent Literature

Patent Literature 1: JP 2020-52030 A

SUMMARY OF INVENTION

Technical Problem

Monitoring cameras and disaster prevention cameras can also be used as means for grasping a snow accumulation condition. If a snow accumulation can be grasped using the camera, the staff do not need to perform patrol every day, and the above-described demand can be satisfied.

However, means using monitoring cameras and disaster prevention cameras needs to install a large number of cameras in a snowy suburban area. Further, it is difficult to accurately grasp a snow accumulation from a captured camera image. This is because it is difficult to discriminate between white uneven snow surface due to the characteristics of the camera. Further, it is more difficult to grasp a snow accumulation depending on weather conditions such as the time of dense fog and the time of snowfall. That is, the means using the cameras for remotely grasping the snow accumulation has an economic problem of installing a large number of cameras and a problem in accuracy of the snow accumulation to be grasped.

In this respect, in order to solve the above problems, objects of the present invention are to provide a snow accumulation estimating system and a method for estimating a snow accumulation which enable measurement of a snow accumulation or snow removal necessity determination to be remotely performed accurately and economically.

Solution to Problem

In order to achieve the above objects, a snow accumulation estimating system according to the present invention is configured for estimating a snow accumulation using an optical fiber sensing technology (distributed acoustic sensing (DAS)) capable of measuring vibrations of an optical cable in a distributed manner.

specifically, a snow accumulation estimating system according to the present invention includes:

an optical fiber that receives vibration from a random point on snow;

a vibration measuring instrument that measures the vibration received by the optical fiber as a distribution in a longitudinal direction of the optical fiber; and an analysis processing unit that has, as accumulated data, a relationship between a snow accumulation or snow removal necessity and the vibration received by the optical fiber, compares the distribution measured as measurement data by the vibration measuring instrument with the accumulated data, and estimates a snow accumulation at the random point or determines snow removal necessity.

Further, a method for estimating a snow accumulation according to the present invention includes:

receiving vibration from a random point on snow by an optical fiber;

measuring the vibration received by the optical fiber as a distribution in a longitudinal direction of the optical fiber, by a vibration measuring instrument; and comparing the distribution with accumulated data that is a relationship between a snow accumulation or snow removal necessity and the vibration received by the optical fiber for estimating the snow accumulation at the random point or determining snow removal necessity by using the distribution as measurement data.

Here, preferably, the analysis processing unit sets at least one of a traveling speed of a vehicle passing by the random point, a temperature at the random point, and a temperature change at the random point as additional data, also sets a relationship between the additional data and the snow accumulation or the snow removal necessity as the accumulated data, and also compares the additional data with the accumulated data when estimating the snow accumulation or determining the snow removal necessity.

In the snow accumulation estimating system and the method for estimating a snow accumulation, the vibration transmitted from snow surface to the optical fiber laid underground via accumulated snow is measured using a DAS, a magnitude or a frequency characteristic of the vibration of the optical fiber and a vehicle traveling speed measurable by the DAS are analyzed, and the snow accumulation or snow removal necessity is estimated from a relationship, previously stored as the accumulated data, between a vibration characteristic transmitted to an underground optical fiber, a vehicle traveling speed, an outside temperature or a temperature change, and a snow accumulation or snow removal necessity. That is, the snow accumulation estimating system and the method for estimating a snow accumulation estimate the snow accumulation from an attenuation amount of the vibration at a time when the vibration from the snow surface reaches the optical fiber installed in the ground, the vehicle traveling speed, the outside temperature, or the temperature change by using the acoustic characteristics (sound absorbing property) of the snow accumulated on the ground and DAS.

Hence, the present invention can provide the snow accumulation estimating system and the method for estimating a snow accumulation which enable measurement of a snow accumulation or snow removal necessity determination to be remotely performed accurately and economically.

Here, it is desirable to measure an optical fiber length from the vibration measuring instrument to the random point, acquire the distribution for each snow accumulation, acquire the vibration received by the optical fiber for each random point and each snow accumulation, and generate the accumulated data, in advance.

The vibration from the random point on snow may be road noise, and the analysis processing unit may statistically process the distribution to obtain the measurement data. By using the vibration acquired when the vehicle passes, the snow accumulation can be estimated always. However, since the vibration acquired when the vehicle passes varies, it is necessary to statistically process a certain amount of data. In addition, since the traveling speed of the vehicle decreases due to an increase in snow accumulation, it is possible to improve the estimation accuracy of the snow accumulation or the snow removal necessity by accumulating, as accumulated data, a correlation with the snow accumulation or the snow removal necessity.

On the other hand, a sound source that generates the vibration at the random point on snow may be further included. In this regard, the analysis processing unit desirably includes a band-pass filter that selects a frequency of the vibration generated by the sound source. By using the known vibration, the snow accumulation can be accurately grasped.

A plurality of the optical fibers may be arranged in parallel. The snow accumulation estimation accuracy can be improved.

The accumulated data may include an optical fiber length from the vibration measuring instrument to the random point, and the analysis processing unit may set vibration data near the random point in the distribution as the measurement data. Since only a desired measurement spot is analyzed, the analysis processing can be speeded up.

Moreover, the inventions described above can be combined as much as possible.

Advantageous Effects of Invention

The present invention can provide the snow accumulation estimating system and the method for estimating a snow accumulation which enable measurement of a snow accumulation or snow removal necessity determination to be remotely performed accurately and economically.

DESCRIPTION OF EMBODIMENTS

Figure 1:
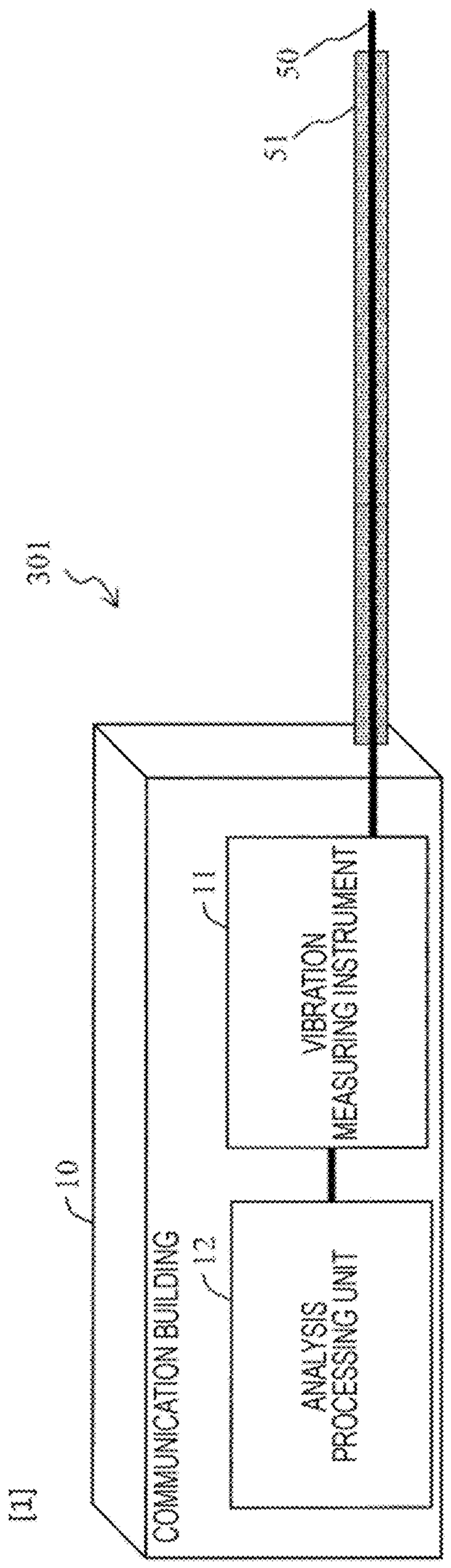
FIG. 1 is a diagram describing a snow accumulation estimating system according to the present invention.

Embodiments of the present invention will be described with reference to the accompanying drawings. The embodiments to be described below are examples of the present invention, and the present invention is not limited to the following embodiments. Components assigned the same reference numerals in the present specification and the drawings are the same components.

[Features of the Invention]

A snow accumulation estimating system according to the present invention uses an optical fiber sensing technology (DAS: Distributed Acoustic Sensing) capable of measuring vibration of an optical fiber in a distributed manner, measures a magnitude or a frequency characteristic of the vibration of the optical fiber laid under a spot (measurement spot), as a random point, where a snow accumulation is measured, and analyzes the magnitude or the frequency characteristic of the vibration, thereby estimating a snow accumulation at the measurement spot.

Since snow has acoustic characteristics of a porous material and has high sound absorbency, snow accumulation on a road surface has an effect of attenuating sound on the ground (road noise or the like) transmitted to an optical fiber laid under the ground by an attenuation amount corresponding to the snow accumulation. Therefore, the sound transmitted to the optical fiber is measured by the DAS, and the snow accumulation on the ground can be estimated by the magnitude or a change in frequency characteristics of the vibration caused by the sound.

Hence, the snow accumulation estimating system according to the present invention can remotely monitor the snow accumulation by utilizing the optical fiber of an existing optical fiber network.

Embodiment 1

FIG. 1 is a diagram describing a snow accumulation estimating system 301 according to this embodiment. The snow accumulation estimating system 301 includes

- an optical fiber 50 that receives vibration from a random measurement spot on snow,
- a vibration measuring instrument 11 that measures the vibration received by the optical fiber 50 as a distribution in a longitudinal direction of the optical fiber 50, and
- an analysis processing unit 12 that has, as accumulated data, a relationship between a snow accumulation or snow removal necessity and the vibration received by the optical fiber 50, compares the distribution measured as measurement data by the vibration measuring instrument 11 with the accumulated data, and estimates a snow accumulation at the random measurement spot or determines snow removal necessity.

The optical fiber 50 may be embedded in the optical cable 51. In this embodiment, an example in which the optical cable 51 is laid in the ground will be described.

In addition, the vibration measuring instrument 11 and the analysis processing unit 12 can be arranged in the communication building 10 which is a base for snow accumulation management.

The vibration measuring instrument 11 measures vibration of the optical fiber 50 housed in the optical cable 51, in a distributed manner in the longitudinal direction. The vibration measuring instrument 11 is a light reflection measuring device capable of measuring a phase change and an intensity change of Rayleigh scattered light, such as a phase sensitive optical time domain reflectometer (φOTDR) and an optical frequency domain reflectometry (OFDR). The vibration measuring instrument 11 can perform position resolution to measure vibration of the optical fiber 50 under the ground at the measurement spot in a distributed manner. The vibration measuring instrument 11 has position resolution capable of measuring vibration in a range (length) in which an actual snow accumulation can be regarded as a constant or in a range sufficiently narrower than a range in which a sound generated above a snow accumulation surface is transmitted.

The vibration measured by the vibration measuring instrument 11 is vibration caused by a sound wave generated above the snow accumulation surface, and for example, road noise or the like can be used as a vibration source.

The vibration measured by the vibration measuring instrument 11 may be vibration caused by a sound source having a known frequency (band) spectrum. At this time, the wider the known frequency band, the more clearly a frequency spectrum change caused by snow accumulation can be observed.

A buried depth of the optical cable 51 and the geological features around an underground pipeline through which the optical cable 51 passes, a manhole thereof, and a handhole thereof affect propagation characteristics of the sound wave generated on the ground, and thus, it is desirable that the buried depth be constant or known.

The analysis processing unit 12 analyzes the magnitude or frequency spectrum of the vibration on the optical fiber 50 measured by the vibration measuring instrument 11. In addition, the analysis processing unit 12 accumulates the magnitude, the change in the frequency spectrum, or both of the vibration received by the optical fiber 50 depending on a non-snow accumulation condition and the snow accumulation in advance as teacher data (accumulated data). In addition, instead of the snow accumulation itself, the relationship between the magnitude, the change in the frequency spectrum, or both of the vibration received by the optical fiber 50 and the snow removal necessity may be used as the accumulated data. At the time of measuring the snow accumulation, the analysis processing unit 12 compares the magnitude or the frequency spectrum of the vibration on the optical fiber 50 with the accumulated data, and estimates the snow accumulation or determines snow removal necessity.

The analysis processing unit 12 will be described in more detail.

Since snow accumulation has porous characteristics, snow has excellent sound absorbency, and this sound absorbency has attenuation characteristics of sound (that is, vibration) depending on a snow accumulation depth and an attenuation constant according to the frequency (see, e.g., Reference). It is possible to estimate a snow accumulation if a vibration or frequency attenuation state can be obtained.

[Reference] Teruo Iwase, "Acoustical Characteristics of Snow and Their Effects on Sound Propagations in and on Snow", Journal of Snow Engineering of Japan, Vol. 13 No. 3, 33-40, 1997.07

In this respect, the snow accumulation estimating system 301 records vibration characteristics transmitted to the optical fiber 50 in advance at the time of non-snow accumulation and in a state of a known snow accumulation (may be a determination criterion of snow removal necessity instead of the snow accumulation itself). This information is the accumulated data. Accordingly, when an actual snow accumulation (snow accumulation to be measured from now) is estimated, the analysis processing unit 12 acquires a vibration waveform (evaluation data) in the snow accumulation (objective variable) and calculates a degree of correlation with the accumulated data. The analysis processing unit 12 outputs a snow accumulation of the accumulated data having the highest degree of correlation with the evaluation data as an actual snow accumulation or a snow removal necessity result.

When the snow accumulation is estimated by the vibration characteristic caused by the road noise, a place where the underground pipeline of the optical fiber 50 buried along the road crosses the road is set as a measurement spot. Road noise for each passing of a vehicle is impulsively transmitted to the optical fiber 50. The road noise is highly quantifiable vibration that is effective in a case where estimation of a snow accumulation or determination of snow removal necessity is performed by an amplitude (magnitude) of the vibration. In addition, when the estimation of the snow accumulation or the determination of snow removal necessity is performed based on the vibration characteristics caused by the road noise, only the accumulated data and the evaluation data in a section in which the underground pipeline crosses the road (hereinafter, referred to as a "road crossing pipeline section") are sufficient, and it is not necessary to record vibration characteristics of an entire of the optical fiber 50. This has an effect of reducing a processing amount of the analysis processing unit 12.

When the estimation of the snow accumulation or the determination of the snow removal necessity is performed based on the vibration characteristics caused by the road noise, it is necessary to grasp in advance how far the road crossing pipeline section as the measurement spot is from the vibration measuring instrument 11 installed in the communication building 10, on an occasion of non-snow accumulation. The distance can be measured by using the vibration measuring instrument 11 to grasp a vibration spot where the road surface of the road crossing pipeline section or an iron lid of a nearest manhole has been struck (for example, see Patent Literature 1). Moreover, the vibration that has struck the road surface can be observed by the optical fiber 50 similarly to the vibration that has struck the iron lid of the manhole.

Moreover, a magnitude and frequency characteristics of the road noise vary depending on a weight and a traveling speed of a vehicle. Therefore, the analysis processing unit 12 performs statistical processing (averaging or the like) on a certain number of vehicles or vibrations for a certain period of time and estimates the snow accumulation or determines the snow removal necessity on the basis of the statistically processed data.

In addition, the analysis processing unit 12 may not output the snow accumulation at a single measurement spot, but may analyze vibration data at a plurality of measurement spots and output an average of snow accumulations at the measurement spots in a range (for example, within a radius of 200 m) in which an actual snow accumulation condition is considered to be substantially constant.

A plurality of optical fibers 50 may be arranged in parallel. The analysis processing unit 12 can improve the estimation accuracy of the snow accumulation by analyzing and calculating vibrations measured using two or more optical fibers 50 in the same time zone. Here, the plurality of optical fibers 50 may be two or more optical fibers laid in parallel or two or more optical fibers housed in the same optical cable 51. In addition, the same time zone is preferably a time range in which vibration caused by the same sound source (including the above-described vehicle) can be measured, but may be a time range (for example, one hour or the like) in which the actual snow accumulation does not change.

When analyzing the vibration of the optical fiber 50 caused by a sound source having a known frequency (band), the analysis processing unit 12 preferably performs analysis using data in which disturbance noise is reduced by a frequency filter such as a high-pass filter, a low-pass filter, or a band-pass filter. It is possible to improve the estimation accuracy of the snow accumulation by analyzing a power spectrum of only the known frequency (band) as the vibration.

The analysis processing unit 12 can speed up the analysis processing by cutting out and using only data near the measurement target spot out of the vibration measured by the vibration measuring instrument 11.

Embodiment 2

In this embodiment, a technique for estimating a snow accumulation or determining snow removal necessity with high accuracy will be described.

The analysis processing unit 12 of the snow accumulation estimating system 301 of this embodiment sets at least one of a traveling speed of a vehicle passing by the random point, a temperature at the random point, and a temperature change at the random point as additional data, also sets a relationship between the additional data and the snow accumulation or the snow removal necessity as the accumulated data, and also compares the additional data with the accumulated data when estimating the snow accumulation or determining the snow removal necessity.

For example, a traveling speed of the vehicle at a random point may be measured by the DAS. Alternatively, the traveling speed may be acquired from another database. Since the traveling speed of the vehicle decreases due to an increase in snow accumulation, it is practical to improve the estimation accuracy of the snow accumulation or determination accuracy of the snow removal necessity by accumulating, as accumulated data, a correlation with the snow accumulation or the snow removal necessity.

In addition, temperature and temperature change information can be acquired from another database (for example, a database of the Japan Meteorological Agency). Since the snow accumulation is significantly affected by the temperature and fluctuations therein, the estimation accuracy and the determination accuracy can be improved by accumulating, as accumulated data, the correlation between the temperature or the fluctuations therein and the snow accumulation or the snow removal necessity, and by adding information of the temperature and the fluctuations thereof to the determination of the snow accumulation or the snow removal necessity estimated as in Embodiment 1.

Embodiment 3

Figure 2:
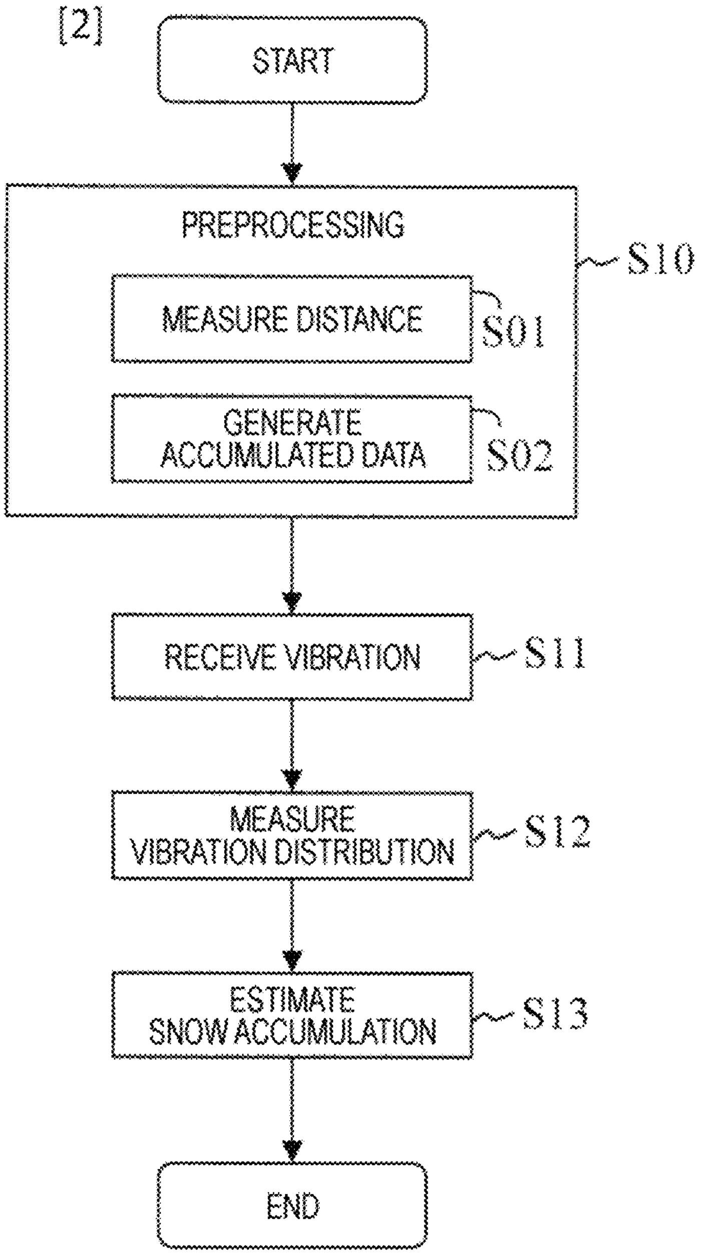
FIG. 2 is a flowchart illustrating a method for estimating a snow accumulation according to the present invention.

FIG. 2 is a flowchart for describing a method for estimating a snow accumulation performed by the snow accumulation estimating system 301. This method for estimation includes receiving vibration from a random measurement spot on snow by the optical fiber 50 (Step S11), measuring the vibration received by the optical fiber 50 as a distribution in a longitudinal direction of the optical fiber, by a vibration measuring instrument 11 (Step S12), and comparing the distribution with accumulated data that is a relationship between a snow accumulation or snow removal necessity and the vibration received by the optical fiber 50 for estimating the snow accumulation at the measurement spot or determining snow removal necessity by using the distribution as measurement data (Step S13).

In addition, the accumulated data is acquired before Step S11 is performed (Step S10). In Step S10,

- an optical fiber length from the vibration measuring instrument 11 to the measurement spot is measured (Step S01), and
- the distribution for each snow accumulation is acquired, the vibration received by the optical fiber 50 for each measurement spot and each snow accumulation is acquired, and the accumulated data is generated (Step S02).

In Step S01, the snow accumulation estimating system 301 is used to acquire a distance between the vibration measuring instrument 11 and the spot where the snow accumulation is estimated by any one of the following methods.

(1) The vibration measuring instrument 11 is used to identify vibration that has struck the road surface at the measurement spot, thereby acquiring the distance.

(2) In a closure housed in a manhole nearest to the measurement spot, the optical fiber 50 is bent, and a position of a loss caused by the bending is measured by the OTDR.

(3) The equipment information (length) of the underground optical cable 51 is referred to.

In Step S02, the snow accumulation estimating system 301 measures a vibration distribution of the optical fiber 50 at the time of no snowfall or when the snow accumulation is known. Accordingly, the magnitude and the frequency spectrum of the vibration transmitted from the sound source (for example, road noise) are recorded for each snow accumulation and used as accumulated data.

Step S11 and the subsequent steps are performed when it is desired to measure a snow accumulation.

In Step S11, vibration is applied at a measurement spot on snow at a random time point. The vibration to be applied may be vibration in a predetermined frequency band caused by a sound source or may be vibration when the vehicle travels. The vibration is transmitted to the optical fiber 50 through snow. Accordingly, the vibration is attenuated depending on a distance during propagation in the snow.

In Step S12, the vibration received by the optical fiber 50 is measured as a distribution in the longitudinal direction of the optical fiber by the vibration measuring instrument 11.

In Step S13, the analysis processing unit 12 compares vibration data, existing at a desired position (spot where vibration is applied) of the distribution as measurement data at the measurement spot, with the accumulated data described above and estimates a snow accumulation at the spot or determines snow removal necessity.

Other Embodiments

The snow accumulation estimating system 301 can simultaneously estimate snow accumulations at a plurality of measurement spots by collectively measuring distributions of vibrations at the plurality of measurement spots and analyzing the vibrations by position resolution. At this time, the optical fiber 50 is laid to connect a plurality of measurement spots unicursally.

Moreover, the measurement spot is preferably a manhole, an underground pipeline, or a handhole. The vibration source (sound source) may not be present immediately above the measurement spot, but is desirably present at a certain distance where the vibration reaches the optical fiber.

It is sufficient that the frequency spectrum transmitted to the optical fiber 50 can be analyzed from 2 Hz to 5 kHz. When vibration is applied by an artificial sound source, a sound source that emits a sound falling within the frequency range is used.

REFERENCE SIGNS LIST

10 Communication building
11 Vibration measuring instrument

12 Analysis processing unit
50 Optical fiber
51 Optical cable
301 Snow accumulation estimating system

The invention claimed is:

1. A snow accumulation estimating system comprising:

an optical fiber embedded in the ground and that receives vibration from a random point on snow on the ground;

a vibration measuring instrument that measures the vibration received by the optical fiber as a distribution in a longitudinal direction of the optical fiber; and an analysis processing unit that has, as accumulated data, a relationship between a snow accumulation or snow removal necessity and the vibration received by the optical fiber embedded in the ground, the relationship being between (a) the snow accumulation or snow removal necessity and (b) at least one of (i) magnitude of the vibration received by the optical fiber and (ii) a change in frequency spectrum of the vibration received by the optical fiber, compares the distribution measured as measurement data by the vibration measuring instrument with the accumulated data, and estimates a snow accumulation at the random point or determines snow removal necessity based on the comparison.

2. The snow accumulation estimating system according to claim 1, wherein the vibration from the random point on snow on the ground is road noise, and the analysis processing unit statistically processes the distribution to obtain the measurement data.

3. The snow accumulation estimating system according to claim 1, further comprising a sound source that generates the vibration at the random point on snow on the ground.

4. The snow accumulation estimating system according to claim 3, wherein the analysis processing unit includes a band-pass filter that selects a frequency of the vibration generated by the sound source.

5. The snow accumulation estimating system according to claim 1, wherein the analysis processing unit sets at least one of a traveling speed of a vehicle passing by the random point, a temperature at the random point, and a temperature change at the random point as additional data, also sets a relationship between the additional data and the snow accumulation or the snow removal necessity as the accumulated data, and also compares the additional data with the accumulated data when estimating the snow accumulation or determining the snow removal necessity.

6. The snow accumulation estimating system according to claim 1, wherein a plurality of the optical fibers are arranged in parallel and embedded in the ground.

7. The snow accumulation estimating system according to claim 1, wherein the accumulated data includes an optical fiber length from the vibration measuring instrument to the random point, and the analysis processing unit sets vibration data near the random point in the distribution as the measurement data.

8. A method for estimating a snow accumulation, comprising:

receiving vibration from a random point on snow on the ground by an optical fiber embedded in the ground;

measuring the vibration received by the optical fiber as a distribution in a longitudinal direction of the optical fiber, by a vibration measuring instrument; and comparing the distribution with accumulated data that is a relationship between a snow accumulation or snow removal necessity and the vibration received by the optical fiber embedded in the ground, the relationship being between (a) the snow accumulation or snow removal necessity and (b) at least one of (i) magnitude of the vibration received by the optical fiber and (ii) a change in frequency spectrum of the vibration received by the optical fiber; and estimating the snow accumulation at the random point or determining snow removal necessity based on the comparison.

* * * * *